June 6, 1939.  W. BROWN  2,161,014
OVEN FOR MAKING ARTIST'S CHARCOAL
Filed June 4, 1937
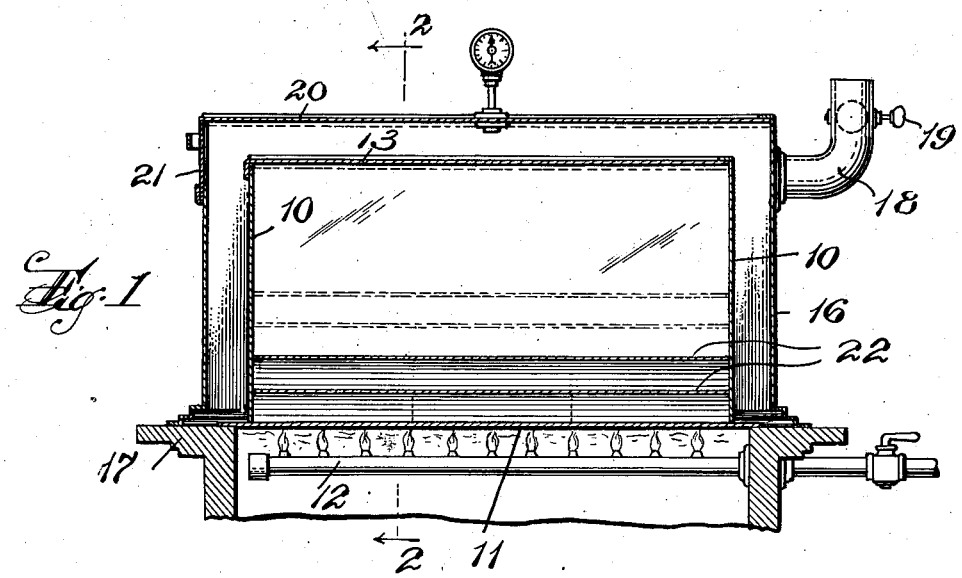
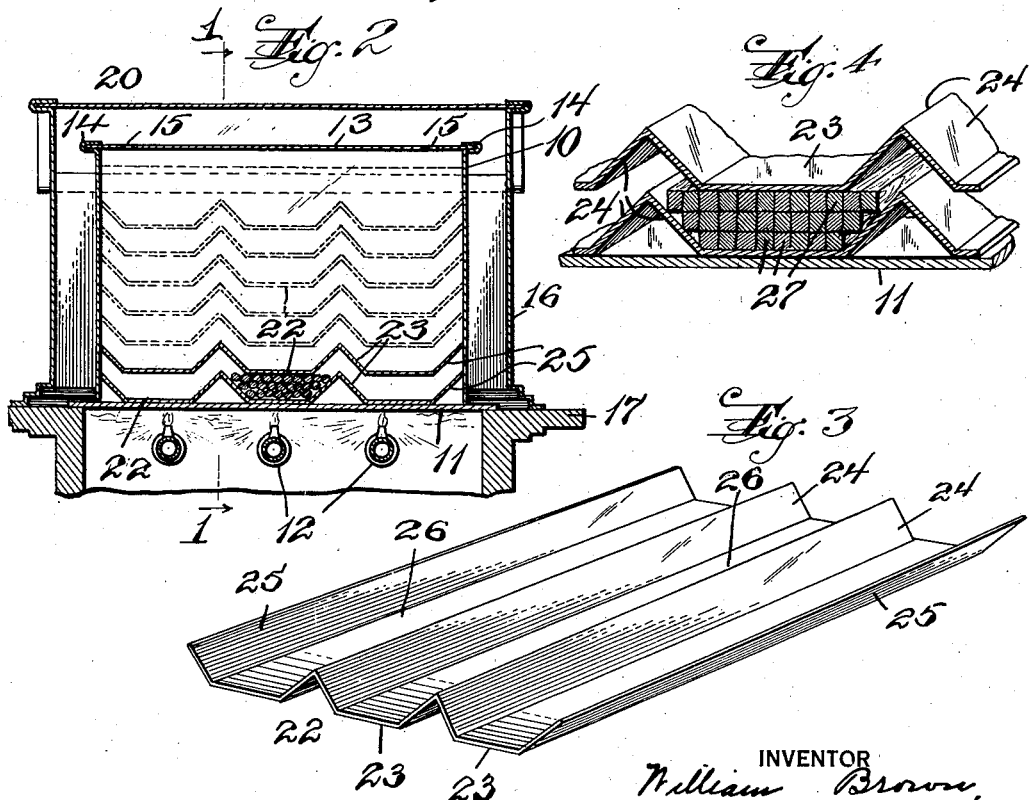
INVENTOR
William Brown,
BY
Wm. H. Caulfield
ATTORNEY.

Patented June 6, 1939

2,161,014

UNITED STATES PATENT OFFICE 2,161,014

OVEN FOR MAKING ARTISTS' CHARCOAL

William Brown, Irvington, N. J.

Application June 4, 1937, Serial No. 146,372

2 Claims. (Cl. 202—210)

This invention relates to an oven for charring wood and is particularly designed to provide an oven for making charcoal sticks for artists' use. The particular object of the invention is to provide an oven that will produce in quantities, that is, at one operation a large number of sticks are produced, and in addition the sticks will be substantially straight which is desirable not only for easier handling in use but for more durability as they will bear more strain in stroking.

The oven is also devised for easy removal of the charcoal sticks after they are ready for use and also for the ready and easy insertion of a number of sticks of wood when the oven is being filled.

The invention is illustrated in the accompanying drawing in which Figure 1 is a longitudinal section of my improved oven taken on line 1—1 in Figure 2. Figure 2 is a cross-section of the oven shown in Figure 1, the section being taken on line 2—2 in Figure 1. Figure 3 is a perspective view of a tray used in the oven. Figure 4 is a sectional perspective of fragments of two trays, with the bottom tray containing a number of sticks ready for charring.

The oven comprises a casing 10 which rests on a heating plate 11 which is heated by flame, usually from a gas burner 12 or a series of them. The heating plate forms the bottom of the oven or casing and also supports a set of trays, to be hereinafter described. The casing 10 has a lid 13 which is preferably arranged to slide in the top beads 14 of the side walls. The lid is provided with a suitable number of vents 15 for the escape of by-products resulting from the heat treatment of the wood in the casing.

In order to conserve heat I provide an outer casing 16 which is spaced from the inner casing and sets over it, the outer casing 16 being open at the bottom and resting on the bottom plate 11 or its support 17. The outer casing 16 is also provided with a smoke pipe 18 and a damper 19 which is used to regulate the heat in the oven. The outer casing 16 has a cover, preferably a sliding cover 20 with an apron 21 on the front which allows access to the lid 13 when it is desired to observe the condition of the product. The sliding back of the cover 20 allows the lid 13 to be slid back on account of the apron 21. The plate 11 is provided with a suitable number of openings just outside the walls of the casing 10 to allow the heat from the burner to travel around the casing 10 to the smoke pipe 18.

Inside the inner casing 10 I use trays, each tray holding groups of sticks. The tray 22 of preferred form is shown with the bottom 23 which has the ridges or inclined parts 24 and the inclined side flanges 25. The trays therefore are formed to provide parallel troughs 26 which accommodate a group or bundle of sticks 27 which sticks are relatively short and thus groups are arranged end to end in each trough. The inclined ridges 23 tend to force the sticks 27 together. The flat bottom of the tray above holds the bundle of sticks together tightly and keeps them tight as they shrink under the heat or charring treatment. The flat bottoms 23 of the trays are in the same vertical plane and the stack of trays holds many sticks 27. The advantage of these trays is the placing of a bundle or group of sticks, either square or round or other shapes, and then the stacking of one tray on another so that the sticks in one tray support the tray next above. The sticks, which when finished are called "artists' charcoal" are kept straight against warping and thus a presentable straight charcoal is provided and in quantities at a time. This is a distinct improvement over the former devices in which each stick must be carefully placed in individual channels, these devices receiving only a small number of sticks and consuming much fuel for a comparatively small number of charcoal sticks. The trays of this oven are of a dimension to receive a considerable number of the usual sizes of artists' charcoal in each groove.

As the heating proceeds from the initial steps of heating, the wood shrinks, as the by-products pass out through the vents 15 and the smoke pipe 18, and the trays slide down the side walls of the oven 10 and continue to be supported by the sticks in the trays beneath.

It will be evident that various changes can be made in the form and proportions of parts without departing from the scope of my invention.

I claim:

1. An oven for making artists' charcoal pencils comprising an inner casing closed except for vents for escape of by-products, an outer casing enclosing the inner casing and spaced therefrom, a combined heat control and smoke pipe at the top of said outer casing, a heating plate forming a bottom common to both casings and trays, each tray having a flat bottom portion and outwardly inclined side edges and having upwardly projecting ridges arranged longitudinally, said trays being adapted for stacking within the inner casing, each of the spaces between said sides and between ridges being of a size to receive tiers of assembled sticks, which sticks act to support the bottom of the next tray above.

2. In an oven, a set of trays, each tray having a flat bottom portion and inclined side edges and having upwardly projecting ridges arranged longitudinally, said trays being adapted for stacking within the oven, each of the spaces between said sides and between ridges being of a size to receive tiers of assembled sticks which assembled sticks support the bottom of the next tray above and are thus maintained in shape during charring.

WILLIAM BROWN.